United States Patent
Dickey et al.

[15] 3,644,784
[45] Feb. 22, 1972

[54] SOLID-STATE INDICATOR DISPLAYS

[72] Inventors: Marcus P. Dickey, Minneapolis; Donald C. McIntyre, Roseville, both of Minn.

[73] Assignee: Honeywell Inc., Minneapolis, Minn.

[22] Filed: Apr. 16, 1970

[21] Appl. No.: 29,093

[52] U.S. Cl. ............................... 315/169, 315/132, 340/325
[51] Int. Cl. ........................................................ H05b 33/00
[58] Field of Search .............................. 315/84.5, 130–132, 315/169; 313/108 D; 340/324, 325, 378, 379

[56] References Cited

UNITED STATES PATENTS 3,327,163  6/1967  Blank ..................................... 315/169
3,343,155  9/1967  Pahlavan ............................... 340/324
3,496,410  2/1970  MacIntyre ............................. 315/169

OTHER PUBLICATIONS

Konnerth, Electroluminescent Display IBM Technical Disclosure Bulletin Vol. 8, No. 11, April 1966.

*Primary Examiner*—John Kominski
*Attorney*—Charles J. Ungemach, Ronald T. Reiling and James A. Phillips

[57] ABSTRACT

A display having blocks of display contrasting elements and individual elements electrically connected in a matrix such that two input signals to the matrix energize a number of elements in the form of a pointer which moves in accordance with the input signals.

5 Claims, 5 Drawing Figures

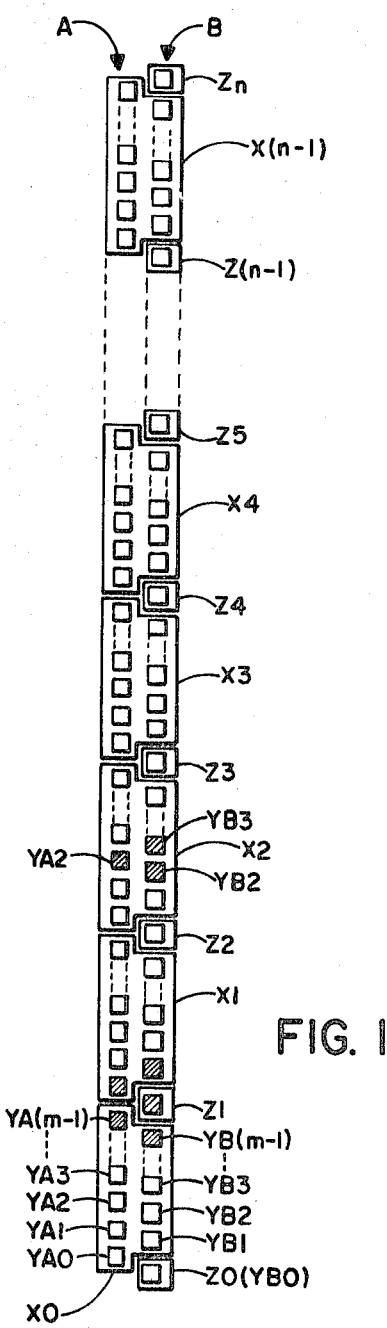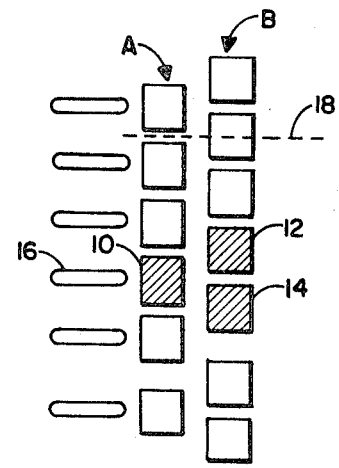
FIG. 1
FIG. 2
INVENTORS
MARCUS P. DICKEY
DONALD C. McINTYRE
BY Charles J. Ungemach
ATTORNEY

SOLID-STATE INDICATOR DISPLAYS

BACKGROUND OF THE INVENTION

Displays up to now have usually used electromechanical servomechanisms to position a pointer to indicate a quantity upon the scale range displayed. This invention is a display using solid state display media, commanded to indicate quantity by means of digital words from a central computer. This display simulates the visual appearance of the conventional servomechanism displays.

SUMMARY

A moving pointer which indicates quantity upon a scale is mechanized such that groups of three, or more, display media segments are activated to provide a contrasted pointer in response to a digital input signal, or signals, representing a quantity to be displayed.

BRIEF DESCRIPTION OF THE DRAWINGS

FIG. 1 is the face of a display made up of two columns of display media segments;

FIG. 2 is an enlarged portion of the display of FIG. 1;

DETAILED DESCRIPTION

FIG. 1 is a display made up of two columns, A and B, of contrasting display media segments, such as LED's (light-emitting diodes). FIG. 2 shows an enlarged portion of the display of FIG. 1 alongside some scale marks. A group of three segments, 10, 12, and 14 are activated (shown as crosshatched) to provide a contrasted pointer indicating the quantity represented by a scale mark 16.

In FIG. 2 the segments of column B are offset from those of column A such that a horizontal line, e.g., dashed line 18, drawn through the center of a segment in column B bisects the spacing between two adjacent segments in column A.

In FIG. 1 the columns A and B are electrically segregated into n blocks, referenced as X0 through $X(n-1)$, and $n+1$ individual segments, referenced as Z0 though Zn. Each block contains m segments in column A, referenced as YA0 through $YA(m-1)$, and $m-1$ segments in column B, referenced as YB1 through $YB(m-1)$. The $n+1$ individual segments Z0 through Zn are also referenced as YB0 segments in column B. This particular display contains $2mn+1$ segments.

Figure 3:
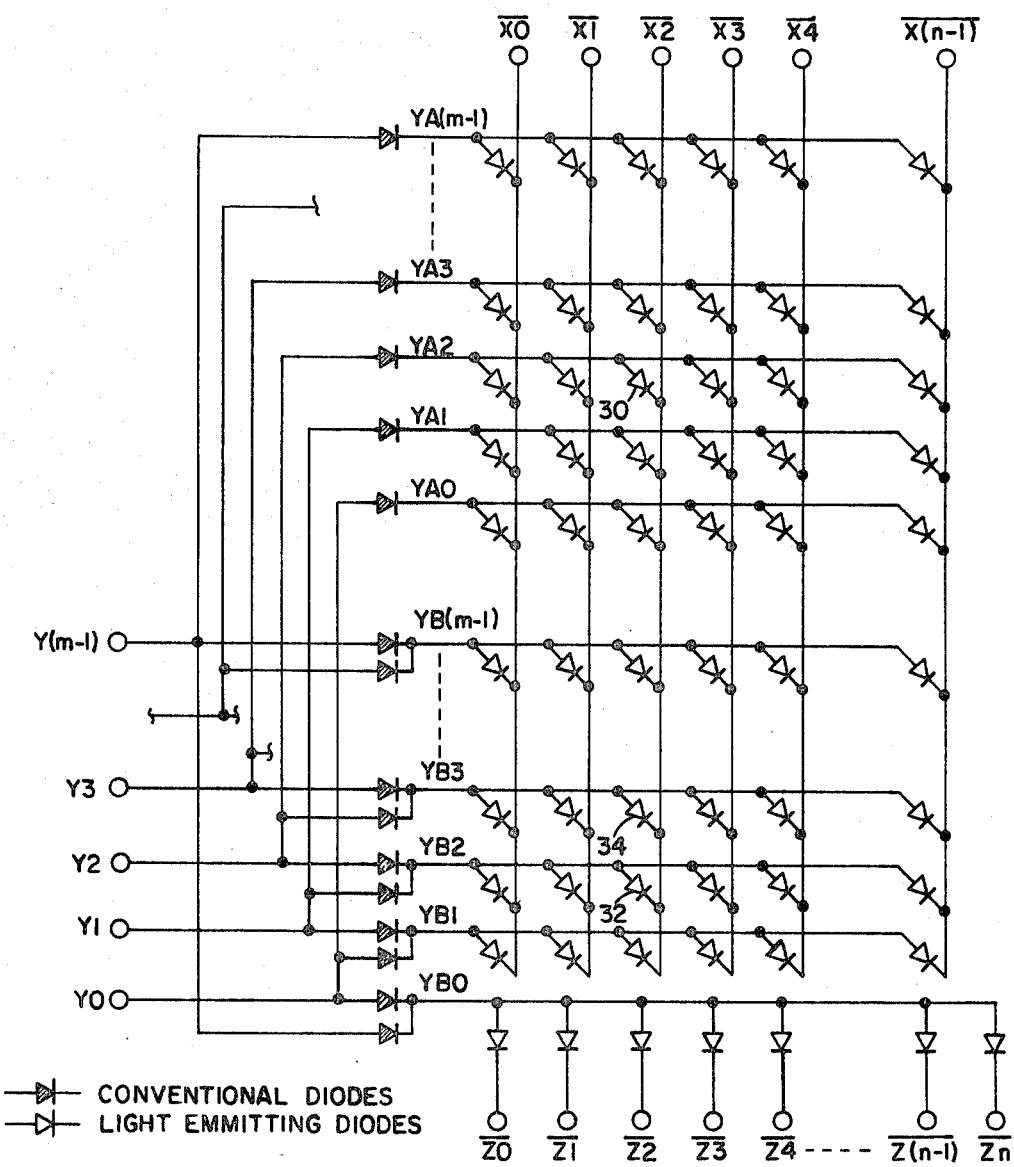
FIG. 3 is an electrical schematic showing how the solid state display media segments are interconnected in a matrix.

The segments of FIG. 1 are electrically connected in a matrix as shown in FIG. 3. By energizing one of $m$ lines referenced as Y0 through $Y(m-1)$, one of n lines referenced as $\overline{X0}$ through $\overline{X(n-1)}$, and, sometimes, one of the $n+1$ lines referenced $\overline{Z0}$ through $\overline{Zn}$ a specific group of three segments (in this case the segments are shown as LED's) can be activated to provide a contrasted pointer. For example, referring to block X2 in FIG. 1, to activate segments YA2, YB2, and YB3 a first positive voltage is applied to line Y2 and a second voltage, negative with respect to the first voltage, is applied to line $\overline{X2}$. The voltage present on line Y2 is applied to the anodes of the YA2, YB2, and YB3 LED's in each block X0 through $X(n-1)$ and the voltage present on line $\overline{X2}$ is applied to the cathode of each LED in block X2. Consequently only the YA2, YB2, and YB3 LED's in block X2 (labeled with the reference numerals 30, 32 and 34 respectively in FIG. 3) are activated and will remain in that state until either one of the lines Y2, $\overline{X2}$ is opened or if the differential voltage between lines Y2 and $\overline{X2}$ is small enough to not cause display contrast or if the voltage on line $\overline{X2}$ becomes more positive than that on line Y2 (back biasing the corresponding LED's).

Two additional examples will illustrate one of the particular advantages of the invention. To activate segments $YA(m-1)$ and $YB(m-1)$ in block X0 and individual segment Z1, lines $Y(m-1)$, $\overline{X0}$ and $\overline{Z1}$ are energized; to activate segments YA0 and YB1 in block X1 and individual segment Z1, lines Y0, $\overline{X1}$ and $\overline{Z1}$ are energized. In the transitions from one block Xk to another $X(k+1)$, e.g., from block X0 to block X1, one of the individual segments $Z(k+1)$, in this case Z1, must be addressed. The following Partial Truth Table illustrates this further.

Partial Truth Table

| Y Line Addressed | X Line Addressed | Z Line Addressed |
|---|---|---|
| $Y(m-2)$ | $\overline{X1}$ | $\overline{Z1}$* |
| $Y(m-1)$ | $\overline{X1}$ | $\overline{Z2}$ required |
| Y0 | $\overline{X2}$ | $\overline{Z2}$ required |
| Y1 | $\overline{X2}$ | $\overline{Z2}$* |
| Y2 | $\overline{X2}$ | $\overline{Z2}$* |
| Y3 | $\overline{X2}$ | $\overline{Z2}$* |
| ⋮ | ⋮ | ⋮ |
| $Y(m-2)$ | $\overline{X2}$ | $\overline{Z2}$* |
| $Y(m-1)$ | $\overline{X2}$ | $\overline{Z3}$ required |
| Y0 | $\overline{X3}$ | $\overline{Z3}$ required |
| Y1 | $\overline{X3}$ | $\overline{Z3}$* |

*Not required, optional

This table indicates, for example, that if lines $Y(m-2)$ and $\overline{X1}$ are addressed (energized) line $\overline{Z1}$ need not necessarily be addressed, that is, the addressing of line $\overline{Z1}$ in this case is not required but is optional. However if lines $Y(m-1)$ and $\overline{X1}$ are addressed, line $\overline{Z2}$ must necessarily be addressed, that is, the addressing of line $\overline{Z2}$ in this case is required and is not optional. $\overline{X}$-lines and $\overline{Z}$-lines of the same number can be addressed with the same voltage in all cases except when the $Y(m-1)$ line is addressed. When a $Y(m-1)$ line is addressed the number of the $\overline{Z}$-line addressed is one unit higher than the corresponding $\overline{X}$-line addressed. This is shown in the second row of entries in the above table and also in the eighth row of entries. This particular function can be accomplished with a number of conventional OR gates and logic, reducing the number of input lines to the display to $m$ lines, Y0 through $Y(m-1)$, and $n$ lines, $\overline{X0}$ through $\overline{X(n-1)}$. This is shown in detail in FIG. 4.

Figure 4:
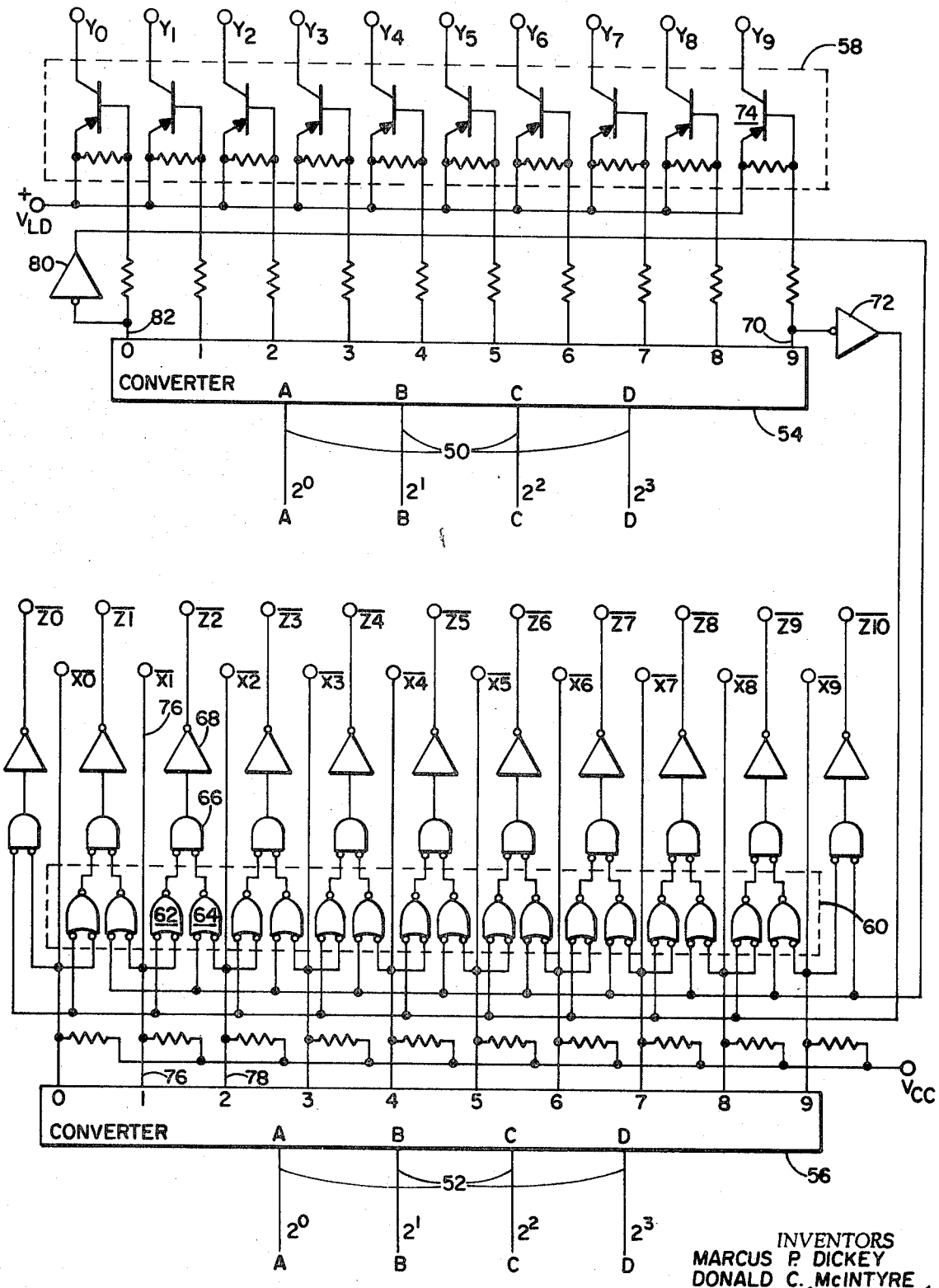
FIG. 4 is a schematic diagram illustrating a kind of logic which can be used to select the proper input signals to the matrix of FIG. 3; and, FIG. 5 is a block diagram of the display.

In FIG. 4 information representing a units digit and a tens digit to be displayed is present on line sets 50 and 52 respectively. The information is in a form called BCD (binary-coded decimal). Line sets 50 and 52 are connected to converters 54 and 56 respectively. These converters convert the incoming BCD information to straight decimal information. The outgoing decimal information from the converters is developed on one of 10 output lines (referenced 0—9) in each converter. FIG. 4 also includes a set of 10 transistor drivers 58, one driver for each output line of converter 54, and nine pairs of OR-gates 60. One of the OR gate pairs comprises OR-gates 62 and 64. OR-gates 62 and 64 are of the type that provide a low output signal if either one or both of the input signals are low. The output terminals of each pair of OR gates are connected to the input terminals of an AND gate. For example, the output leads of OR-gates 62 and 64 are connected to the input terminals of AND-gate 66. AND-gate 66 is of a type that provides a high output signal only if both of the input signals are low. The output of AND-gate 66 is inverted and amplified by amplifier 68 the output of which is applied to the $\overline{Z2}$ line of the matrix of FIG. 3.

The operation of the circuits of FIG. 4 will be explained with a specific example. Assume the units digit to be displayed is a 9 and the tens digit to be displayed is a 1. Referring to the matrix of FIG. 3 this means that a positive voltage must be applied to line $Y(m-1)=Y9$ and relatively negative voltages must be applied to lines $\overline{X1}$ and $\overline{Z2}$. Note that this represents one of the special cases where the number associated with the $\overline{Z}$ line is one unit greater than that associated with the $\overline{X}$ line. Lines A and D of line set 50, representing a numeral 9, are activated and line A of line set 52, representing a numeral 1, is activated. In converter 54, a transistor (not shown) becomes conductive and essentially grounds an output line 70 (the 9 output line). Grounding line 70 causes a transistor 74 in driver 58 to be turned ON which causes a voltage $+V_{LD}$ to be applied to line Y9 through transistor 74. When line 70 is grounded (low) the output of an inverting amplifier 72 is high. Therefore the left input terminal of OR-gate 62, connected to the output of amplifier 72 is high.

In converter 56 a transistor, not shown, becomes conductive, essentially grounding output line 76 (the 1 output line). Line 76 is connected to the $\overline{X1}$ terminal of the matrix of FIG. 3 and right hand input terminal of OR-gate 62. Since at least one of the input terminals of OR-gate 62 is low the output is low. OR-gate 64 has one input tied to an output line 78 (the 2 output line) of converter 56, which is high, and a second input tied to the output of an inverting amplifier 80, the input of which is connected to an output line 82 (the 0 output line) of converter 54. Since line 82 is high the output of amplifier 80 is low and the second input to OR-gate 64 is low. Thus the output of OR-gate 64 is also low. The outputs of OR-gates 62 and 64 form the inputs to AND-gate 66 and since both inputs are low the output of AND-gate 66 is high. Amplifier 68 inverts the output of AND-gate 66, providing a low output signal on the $\overline{Z2}$ line of the matrix of FIG. 3.

Figure 5:
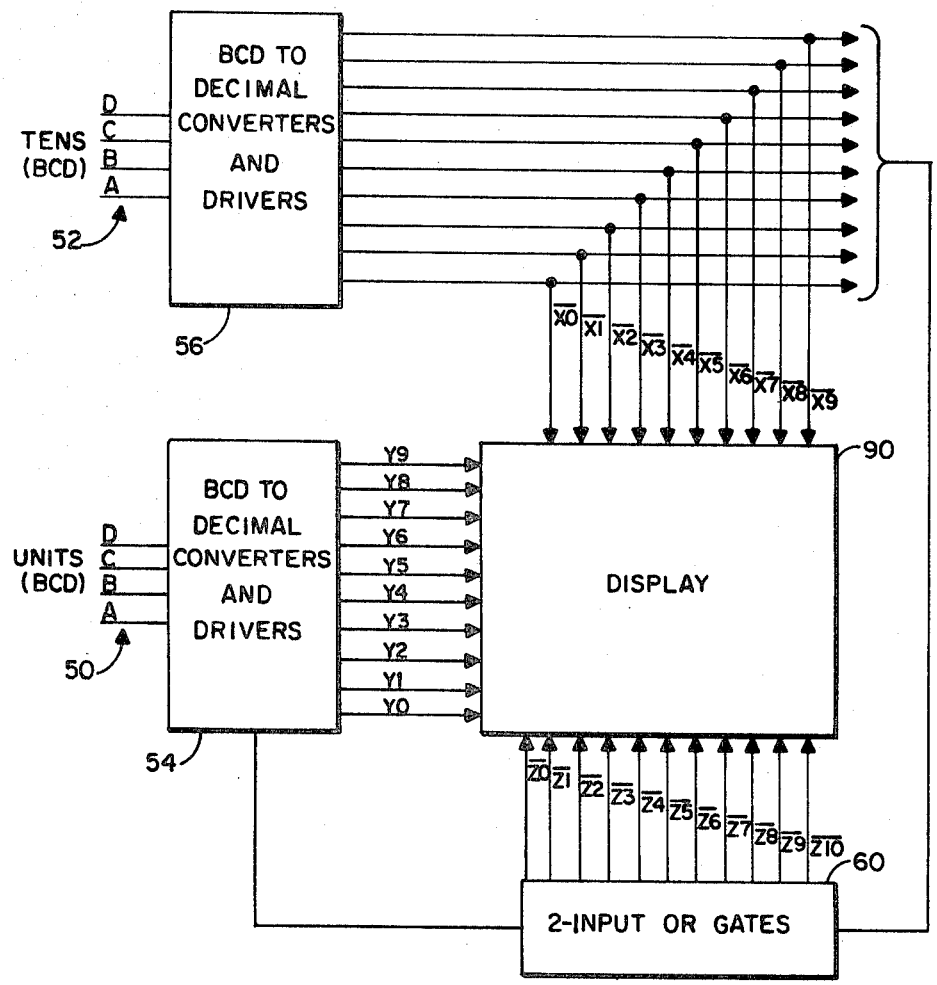

FIG. 5 is a block diagram showing the application and usefulness of the invention. This diagram includes a display 90, of the configuration of FIG. 1, having a total of 201 display media segments, 100 segments in a first column and 101 segments in a second column. The number of display media segments is computed from the formula $2mn+1=201$ where $m=n=$This display will provide a contrasted pointer for a 100 unit scale, that is, a scale with digits 00 to 99. Such a scale has a resolution of 1 percent.

The display command, received from a computer (not shown), is received on two four-line sets 50 and 52. The information received on the lines is in BCD form. The information on line set 52 relates to the 10's digit to be displayed and the information of line set 50 relates to the 1's digit to be displayed. The information is converted from BCD form to straight decimal form in decoders 54 and 56 which include drivers that provide power to display 90 as commanded. The output lines of decoder 56 are connected to lines $\overline{X0}$ through $\overline{X9}$ of the matrix of display 90 and to lines $\overline{Z0}$ through $\overline{Z10}$ through a set of 18 two-input OR-gates 60. The output lines of decoder 54 are connected to lines Y0 through Y9 of the matrix.

The display segments are not limited to light emitting diodes, other devices having unilateral diode characteristics or that can have a series diode added to provide the unilateral diode characteristic and produce display contrast can be used. Liquid crystals e.g., can provide display contrast. They operate on a light scattering rather than a light emitting principle. The shape of the contrasted pointer is not limited to the triangular shape described. Any geometric or irregular shape can be used. Furthermore the shape of the individual display segments is a matter of choice. The number of columns used in the display is also a matter of choice. A display configuration need not be a straight column, for example, the configuration may be curved or irregular and also the scale quantities need not be linear. The display command need not be BCD, but can be any digital code that, when utilized with an appropriate decoder, selects one of $m$ Y-lines and one of $n$ X-lines to drive the matrix.

Many modifications and variations of the present invention are possible and the embodiment described herein should not be considered a limitation of the present invention which is to be limited only by the following claims.

What is claimed is:

1. A display comprising
first and second columns of display media segments, the segments of the second column offset from those in the first column, the columns formed with $n$ blocks of segments and $n+1$ individual segments, each block containing $m$ segments in the first column and $m-1$ segments in the second column, the individual segments being in the second column; and, means for selectively energizing a predetermined pattern of segments in the first column and in the second column.

2. The display of claim 1 wherein the display media segments provide display contrast.

3. The display of claim 2 wherein the display media segments are liquid crystals.

4. The display of claim 1 wherein the display media segments are light emitting diodes.

5. The display of claim 1 wherein the selectively energized predetermined pattern of segments comprises three mutually adjacent segments, one segment in the first column and two segments in the second column.

* * * * *